United States Patent
Maurice

[15] 3,638,425
[45] Feb. 1, 1972

[54] ASSISTED CONTROL ESPECIALLY FOR AUTOMOBILE VEHICLES

[72] Inventor: Jean Maurice, Paris, France
[73] Assignee: Societe Anonyme Francaise Du Ferodo, Paris, France
[22] Filed: Dec. 28, 1970
[21] Appl. No.: 101,514

[30] Foreign Application Priority Data

Jan. 5, 1970 France......................7000121

[52] U.S. Cl..........................................60/54.5 P, 60/54.6 E
[51] Int. Cl............................................................F15b 7/00
[58] Field of Search..........................60/54.5, 54.6 P, 54.6 E

[56] References Cited

UNITED STATES PATENTS

| | | | |
|---|---|---|---|
| 3,222,869 | 12/1965 | Rockwell | 60/54.6 P |
| 3,564,849 | 2/1971 | Huruta et al. | 60/54.6 P |
| 3,540,219 | 11/1970 | Huruta et al. | 60/54.5 P |
| 3,550,377 | 12/1970 | Mockinzuki et al. | 60/54.6 P |
| 2,904,960 | 9/1959 | Ackman | 60/54.6 P |

*Primary Examiner*—Edgar W. Geoghegan
*Assistant Examiner*—A. M. Zupcic
*Attorney*—Young & Thompson

[57] ABSTRACT

A device for the assisted control of two braking or declutching circuits having independent master cylinders, especially for automobile vehicles, of the kind comprising an operating pedal, at least one master cylinder in which a master piston is adapted to slide under the action of said operating pedal, an assistance cylinder in which slides a piston coupled for movement, at least unidirectionally, to said master piston, means for applying pressures on the two faces of said assistance piston, and a piloting valve which, when at rest, ensures equality of the pressures applied to the two faces of the piston of said assistance cylinder and which, responsive to the movement of said operating pedal, ensures an unbalance between said pressures so as to permit the piston of said assitance cylinder to act on said master piston. In this device, each of said braking circuits is associated with an independent master cylinder arranged parallel to the master cylinder of the other braking circuit, the assistance cylinder being disposed between said brake pedal and said master cylinders, a distribution compensating bar is provided in said assistance cylinder and is interposed between the master pistons of said master cylinders and the piston of said assistance cylinder, said piloting valve being controlled by a pressure equal to the pressure existing in at least one of said braking circuits.

7 Claims, 5 Drawing Figures

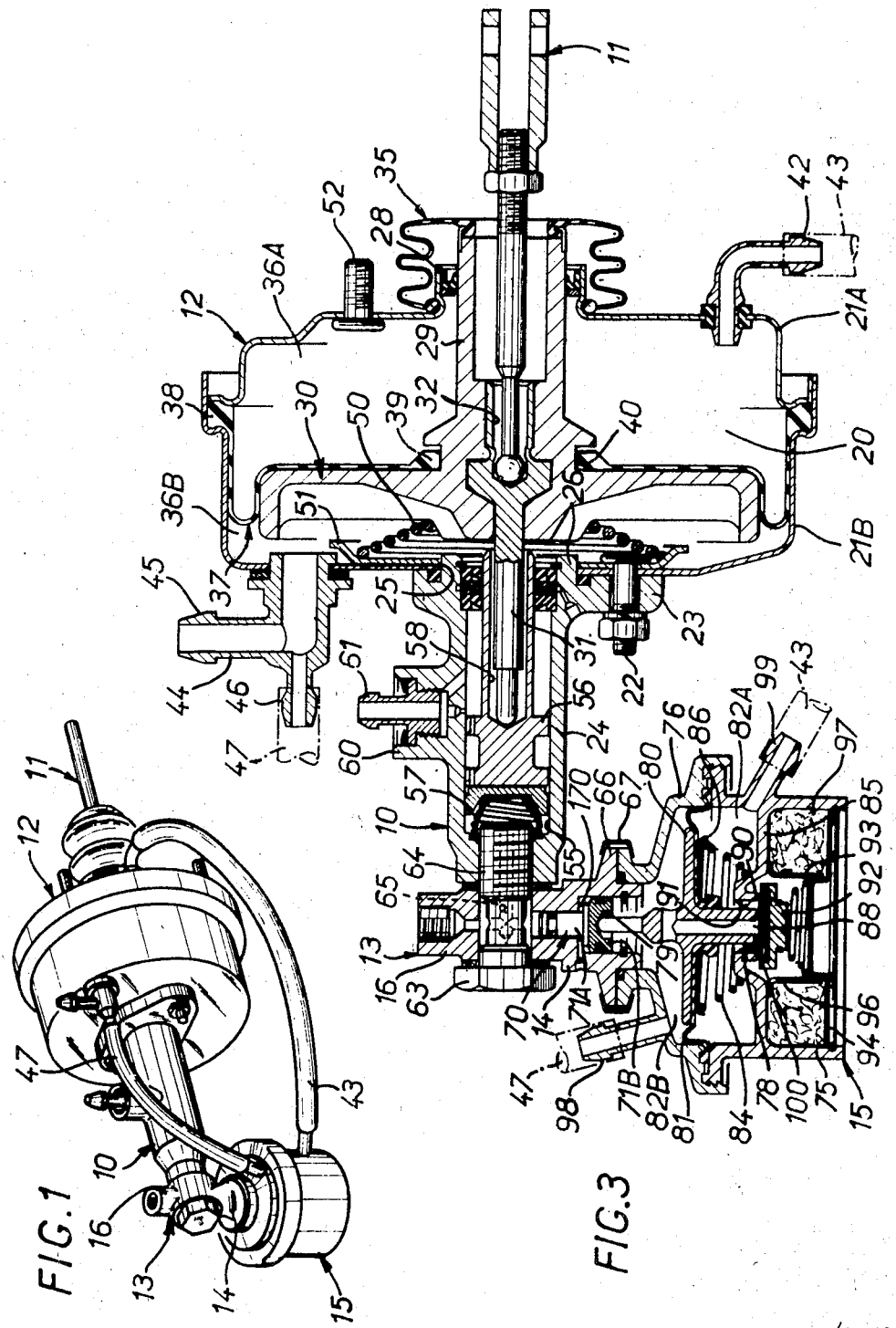

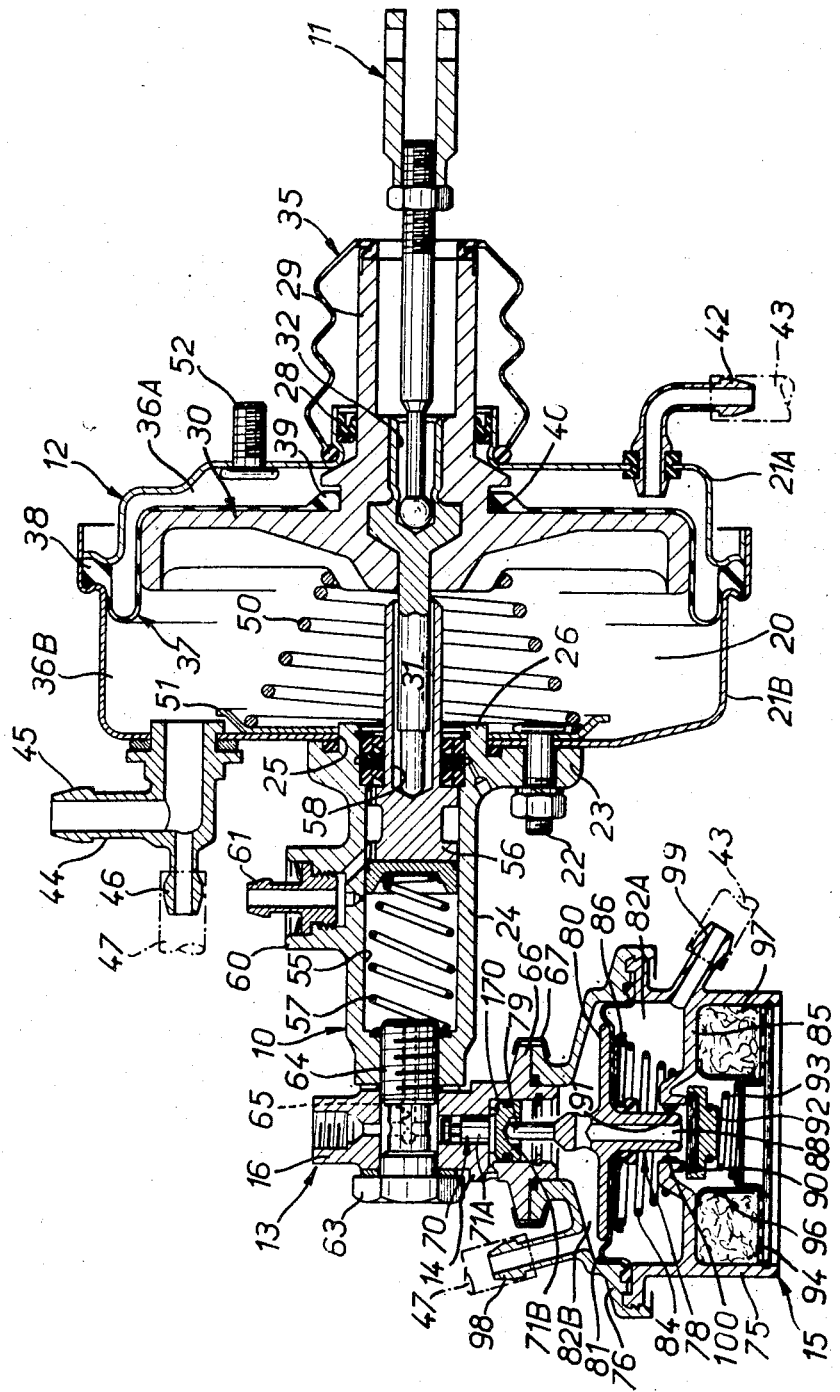

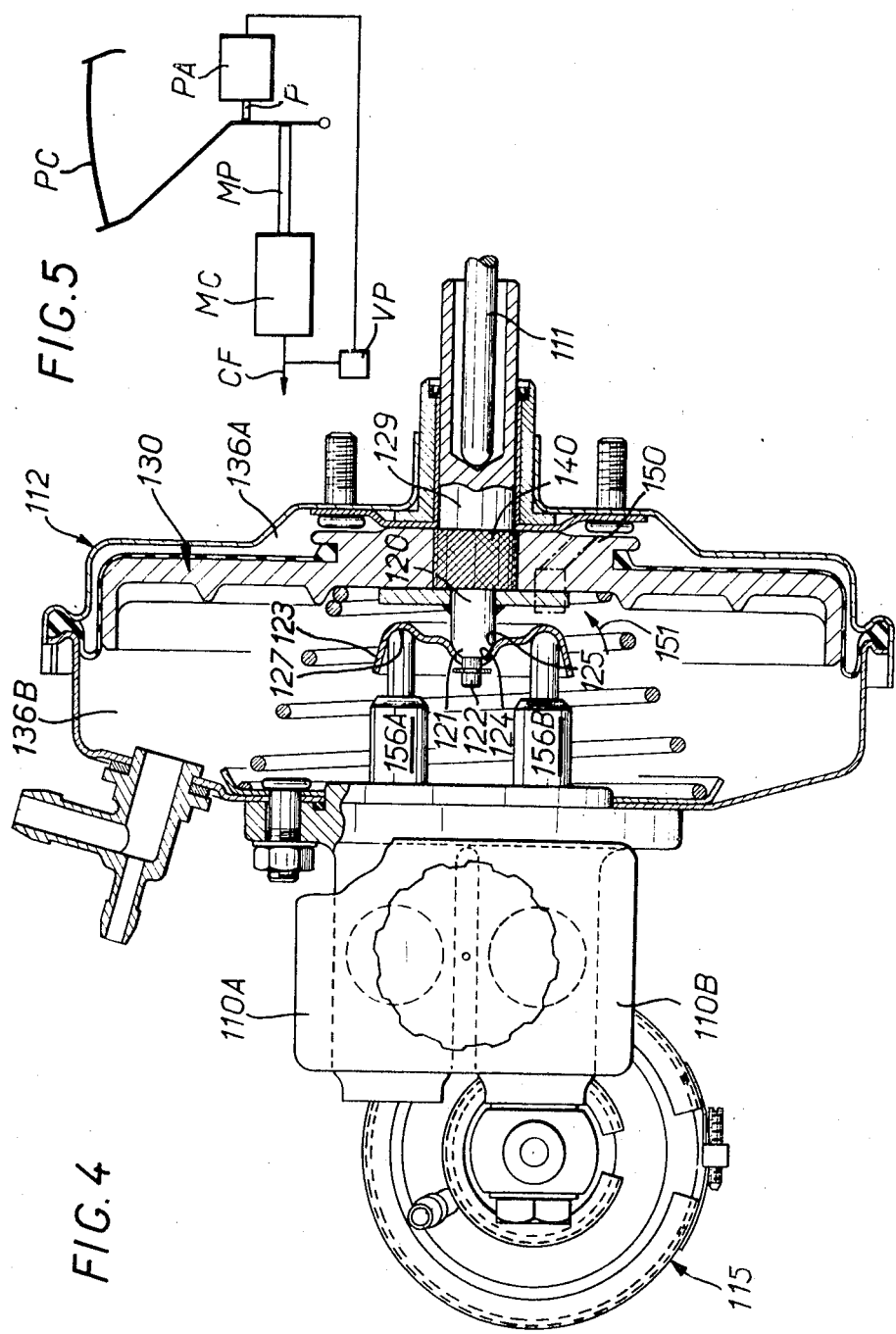

ASSISTED CONTROL ESPECIALLY FOR AUTOMOBILE VEHICLES

The present invention relates generally to the assisted control of a receiver of any kind, and is more particularly directed to the application of such a control to the braking and declutching receivers installed on automobile vehicles.

It is known to interpose between the braking circuit of an automobile vehicle and the pedal which controls this circuit, a master cylinder in which slides a master piston under the control of the said pedal, an assistance cylinder in which slides a piston coupled in movement, at least in one direction, and on the two faces of which pressures can be applied, and a piloting valve which ensures at rest equality of the pressures applied to the two faces of the assistance cylinder and which, responsive to the movement of the brake pedal, ensures in response to this movement, an unbalance between these pressures for the action of the piston of the assistance cylinder on the master piston of the master cylinder.

Outside the braking periods, the pressures applied on both the faces of the piston of the assistance cylinder are therefore equal. In practice, there is employed a depression taken, for example, at the level of the suction necessary for the supply of fuel and combustion-supporting air to the engine of the vehicle.

During braking, this depression is replaced on one of the faces of the piston of the assistance cylinder, by a modulated pressure comprised between the said depression and atmospheric pressure, under the control of the piloting valve and in dependence on the control action exercised by the driver of the vehicle on the brake pedal.

This control action is thus "assisted."

The devices of this type which are known at the present time can be classified in one or the other of two large categories.

In the first of these classes, the whole of the device is arranged between the brake pedal and the master cylinder, and the piloting valve incorporated in the assistance cylinder is arranged kinematically on the upstream side of this latter.

Various disadvantages result from this arrangement.

In the first place, this arrangement has led in certain cases to the interposition between the brake pedal and the piston of the master cylinder, of an elastic washer intended to ensure uniform distribution of the transmitted forces. However, this elastic washer assists in the introduction of a certain inaccuracy in the relation existing between the force applied by the driver of the vehicle on the brake pedal and the braking which is effectively obtained.

In addition, and in all cases, if the piloting valve is subjected to any control error, this error is amplified by the assistance cylinder, due to the fact that this latter is kinematically located downstream of the piloting valve.

Furthermore, and also in all cases, the incorporation of the piloting valve with he assistance cylinder necessarily increases the diameter of this latter and makes it necessary to provide for it a relatively powerful restoring spring which, for the same overall diameter, proportionally reduces the possibilities of assistance offered by the assistance cylinder.

In a second category to which the devices ensuring the assisted control of a braking circuit may belong, these devices are controlled hydraulically, the piloting valve being actuated by a hydraulic pressure which depends on the force applied on the brake pedal.

This arrangement obviously eliminates the inaccuracy referred to above.

On the other hand, it does not eliminate the amplification by the assistance cylinder of any possible control error of the piloting valve, by reason of its position upstream of the master cylinder.

In addition, it leads to the necessity of providing an additional hydraulic control, and it is therefore relatively expensive.

The present invention has for its object an assisted control device which is free from these drawbacks.

The device according to the invention, which is generally provided for the assisted control of at least one receiver, such as a braking receiver, declutching receiver or the like, especially for automobile vehicles, is of the kind comprising a control member such as a pedal, a master cylinder in which slides a master piston under the control of the said pedal, an assistance cylinder in which slides a piston to which the master piston is coupled in movement at least unidirectionally, and on the two faces of which pressures can be applied, and a piloting valve which ensures, at rest, equality of the pressures applied to the two faces of the piston of the assistance cylinder and which, being responsive to the movement of the control pedal, ensures, in response to this movement, an unbalance between the pressures for action of the piston of the assistance cylinder on the master piston, and is characterized in that the piloting valve is hydraulically arranged downstream of the master cylinder.

By virtue of this arrangement, the piston of the assistance cylinder can be rigidly keyed on a shaft which is interposed directly and in a positive manner between the master piston of the master cylinder and the rod system operated by the brake pedal, or which in an alternative form, acts directly and in a positive manner on the brake pedal and thereby on the said master piston.

The result in all cases is that the control of the device according to the invention is more accurate.

In addition, as the piloting valve is no longer arranged in the assistance cylinder, it is possible to reduce the central diameter of this latter substantially and therefore this considerably reduces its overall size for the same degree of effectiveness.

This reduction in diameter has the further corollary that the force acting on the piston of the assistance cylinder due to the differential pressure which is applied thereto is smaller, and in consequence, the restoring spring provided in known manner to counterbalance this force may be a less powerful spring than in the usual assitance cylinders. The result of this is a better efficiency of the assistance obtained, together with a construction which is advantageously lighter and therefore more economical, of the whole of the constituent parts of such an assistance cylinder.

In addition, and referring more particularly to the control of a receiver belonging to a braking circuit, the piloting valve of the device according to the invention, which is no longer incorporated in the assitance cylinder may be arranged at any desired point of this braking circuit, provided that it is upstream of the said receiver.

This arrangement advantageously facilitates the installation of this piloting valve at any desired point available on the vehicle which is equipped with such a device.

Furthermore, and this is a complementary characteristic of the device according to the invention, this piloting valve can advantageously be operated by the pressure effectively existing in the receiver.

When it is thus applied to the braking circuit of an automobile vehicle, the device according to the invention is just as suitable in the case where this vehicle is equipped with a single braking circuit, as in the case when, for safety reasons, the vehicle is equipped with two braking circuits controlled by associated or independent master cylinders.

In the case of two braking circuits operated by independent master cylinders, and in accordance with a further characteristic feature also an object of the present invention, these master cylinders are arranged parallel to each other, and between the master pistons of these master cylinders and the piston of the assistance cylinder is interposed a distribution compensating bar arranged in the said assistance cylinder.

The distribution between the two master pistons of the two master cylinders of the force applied to the brake pedal is thus effected without resulting in any increase whatever in the overall size of the device.

The characteristic features and advantages of the invention will furthermore be brought out in the description which follows below by way of example, reference being made to the accompanying diagrammatic drawings, in which:

FIG. 1 is a general view in perspective of the device according to the invention;

FIG. 2 is a view to a larger scale in axial cross section of the device according to the invention, in the waiting position;

FIG. 3 is a view similar to FIG. 2, the device according to the invention being in the working position;

FIG. 4 is a view partly in elevation and partly in axial cross section, of an alternative form of construction applied to the control of two braking circuits with independent master cylinders;

FIG. 5 is a diagram illustrating a further arrangement of the device according to the invention.

FIG. 1 to 3 relate to a form of construction of a device according to the invention, which is more particularly suitable for the assisted control of a single braking circuit.

This braking circuit, which is not shown in these figures, is operated by a master cylinder 10 under the control of rod 11 actuated by a brake pedal, which also is not shown.

Between the master cylinder 10 and this rod 11 is interposed an assistance cylinder 12, described in detail later, and on the downstream extremity of this master cylinder is mounted a coupling T 13, on one of the lateral arms 14 of which is fixed a piloting valve 15, the other lateral arm 16 of which supplies the associated braking circuit (not shown).

The assistance cylinder 12 comprises a chamber 20 formed by detachably coupling together two half-shells 21A, 21B, the peripheral edges of which face each other.

The half-shell 21A is provided with a central opening 28 for the passage of the rod 29 of a piston 30 mounted so as to move axially in the assistance cylinder 12.

The half-shell 21B is fixed by bolts 22 to a collar 23 fixed on the body 24 of the master cylinder 10. It is provided with a central opening 25 by which it is engaged on an extension 26 of the body 24 of the master cylinder 10.

In the example of construction shown, the piston 30 is overmolded on a metal shaft 31, and this latter is provided with a blind axial housing 32, against the bottom of which is supported the rod 11 which is coupled to the brake pedal. A dust-excluding cover 35 couples the extremity of the rod 29, of the piston 30 to the half-shell 21A of the assistance chamber 12.

The internal volume of the assistance cylinder 12 is divided into two chambers 36A, 36B, by a flexible diaphragm 37, the external periphery 38 of which is secured between the half-shells 21A, 21B in the zone of attachment of these latter, while its internal periphery 39 is engaged in a groove 40 provided in the piston head 29 in its coupling zone to the piston 30.

A nozzle 42 is fixed to the half-shell 21A to permit the chamber 36A to communicate with the piloting valve 15, as will be described below, this communication being made by means of a pipe 43 (see FIG. 1).

The half-shell 21B is provided on its side with a nozzle 44 having two channels, this nozzle being provided with an arm 45 connected to a source of suction (not shown), and an arm 46 intended to couple the chamber 36B of the assistance cylinder to the piloting valve 15, as will be described below, this communication being effected through the intermediary of a pipe 47.

In the chamber 36B of the assistance cylinder 12 is further provided a spring 50 interposed between the piston 30 and a supporting cup 51 fixed by welding to the half-shell 21B; at the same time, the half-shell A of the assistance cylinder 12 is provided with waiting screws 52 for fixing the whole of the device according to the invention to a support of any kind.

In the axial channel 55 of the master cylinder 10, a master piston 56 slides in a manner known per se, a spring 57 being interposed between this half-piston and that of the extremities of the master cylinder which is furthest distant from the assistance cylinder 12. This master piston 56 is provided with a blind axial housing 58, on the bottom of which is supported the shaft 31 which carries the piston 30 of the assistance cylinder 12.

The master cylinder 10 is provided laterally with a bored boss 60 which communicates with the axial channel 55 of the master cylinder, and which serves as a housing for a nozzle 61.

To this nozzle is connected a brake fluid tank, either directly, or by means of a conduit system of any kind, enabling this tank to be placed at any appropriate available point (not shown).

In the example of construction shown, the coupling T 13 is fixed on the master cylinder 10 by a screw 63, the body 64 of which is bored with an axial passage 65 which communicates laterally with the arms 14 and 16 of the T 13.

The arm 14 of this T is flared at its extremity to form a flange 66, on which an annular clip 67 enables the piloting valve 15 to be fixed. This arm 14 is machined with a bore which has a transverse shoulder 170 in its central zone, in which is slidably mounted a piston 70 having two bearing surfaces 71A, 71B of different diameters on each side of the said shoulder 170.

The piloting valve 15 comprises a body 75 on which is fitted a cover 76 serving for its fixing to the flange 66 of the coupling T 13, as described above.

The body 75 of the piloting valve 15 forms with the associated cover 76 a chamber in which is movably mounted a needle valve 78.

One of the extremities of this needle valve 78 is engaged in a blind axial housing 79 of the piston 70, slidably mounted in the arm 14 of the coupling T 13; its other extremity is engaged with an annular clearance 100 in a central opening 91 provided in an internal transverse wall 85 of the body 75 of the piloting valve 15.

In this central zone, the needle valve 78 is provided with a transverse disc 80 which, in cooperation with a flexible diaphragm 81, divides the internal space formed by the piloting valve between the cover 76 and the transverse wall 85, into two chambers 82A, 82B.

The needle valve 78 is subjected to the action of a spring 84 which holds that of its extremities which is engaged in the blind housing 79 of the piston 70 in application against the bottom of this housing. This spring 84 is interposed between the internal transverse wall 85 of the body 75 of the piloting valve 15 on the one hand, and on the other hand a cup 86 which is coupled to the needle valve 78 and which furthermore serves to fix the flexible diaphragm 81 to the needle valve 78.

A needle valve 78 is machined with an axial passage 88 which communicates with the chamber 82B and which opens axially at the level of the central opening 91 of the transverse wall 85 of the body 75 of the piloting valve 15.

The edge 90 of this opening 91 forms a first clapper seating for a moving clapper valve 92 urged in the direction of this clapper seating 90 by a spring 93. The free edge of the needle valve 78 forms a second clapper seating for the mobile clapper 92.

The spring 93 is supported by a perforated end plate 94 which closes the free extremity of the body 75 of the piloting valve 15, and this perforated plate 94 forms, conjointly with a perforated annular wall 96 and a lining 97, an air filter.

In addition, the cover 76 of the piloting valve 15 carries a nozzle 98 on which is branched the conduit 47, for communication of the chamber 82B of this valve with the chamber 36B of the assistance cylinder 12. At the same time, the body 75 of the piloting valve 15 carries a nozzle 99 on which is connected the conduit 43 for communication of the chamber 82A of this piloting valve with he chamber 36A of the assistance cylinder.

The operation of a device of this kind is as follows:

In the waiting position such as shown in FIG. 2, the springs 50 and 57 respectively urge the piston 30 of the assistance cylinder 12 and the master piston 56 of the master cylinder 10 towards the right-hand side of the drawing.

At the same time, the spring 84 of the piloting valve 15 returns the needle valve 78 towards the top of the drawing, the piston 70 being then in abutment against the internal shoulder 170 of the passage in which it slides. Conjointly, the spring 43 of this piloting valve forces the clapper 92 against the clapper seating 90.

In this waiting position, the free extremity of the needle-valve 78, at which opens the axial channel 88 of this latter, is at a distance from the moving clapper 92.

In this position, the source of suction to which the nozzle 45 is connected and which is permanently coupled to the chamber 36B of the assistance cylinder 12, is also connected to the chamber 36A of the assistance cylinder over the following path: nozzle 46 of the assistance cylinder 12, conduit 47, nozzle 98 of the piloting valve 15, the chamber 82B of this latter, the passage 88 of the needle valve 78, the annular space 100 between this needle valve and the opening 91 of the partition 85, chamber 82A of the piloting valve 15, nozzle 99, conduit 43 and nozzle 42 of the assistance cylinder 12.

The same depression is thus applied against both faces of the piston 30 of the assistance cylinder 12.

It will now be assumed that in response to a thrust applied on the brake pedal, the rod 11 coupled to this pedal is displaced from the right towards the left of FIG. 2, against the action of the springs 50 and 57.

This displacement acts in a positive manner to cause an equal displacement of the master piston 56 of the master cylinder 10 so that the pressure in this master cylinder 10 downstream of its master piston 56 increases. In practice, this is the pressure which is sent into the receiver cylinders included in the braking circuit controlled by the master cylinder 10.

Conjointly and according to the invention, this pressure is applied to the piston 70 which, as soon as this pressure is sufficient to overcome the load of the spring 84, slides in the arm 14 of the coupling T 13. This piston then pushes back the needle valve 78 of the piloting valve 15 against the action of the spring 84.

In a first stage, the free extremity of this needle valve then comes into contact with the moving clapper 92 and, forming a second seating for this latter, interrupts the communication between the chambers 82B and 82A of the piloting valve 15. From that moment, the suction source is no longer in communication with the chamber 36A of the assistance cylinder 12.

In a second stage which in practice is developed almost instantaneously with the first, the needle valve 78 continues its travel downwards under the action of the piston 70 and pushes back the clapper 92 against the action of the spring 93. From that moment, the chamber 82A of the piloting valve 15 is in communication with atmospheric pressure through the air filter 94, 96, 97 and the annular space 100 which surrounds the needle valve 78. The pressure in the chamber 82A of the piloting valve then increases until its action on the flexible diaphragm 81 and therefore on the disc 80 of the needle valve 78 counterbalances the action applied on this latter by the hydraulic pressure downstream of the master cylinder 10 through the intermediary of the piston 70. The needle valve 78 thus moves upwards in the piloting valve under the action of the restoring spring 84; the clapper 92 urged by its restoring string 93 follows this movement until it again becomes applied against the clapper seating 90 and thus closes the communication between the chamber 82A of the piloting valve and the atmosphere (see FIG. 3).

At the same time, the pressure in the chamber 82A of the piloting valve, which is thus comprised between the depression which initially existed there and the atmospheric pressure, is applied to the chamber 36A of the assistance cylinder 12 by the piping system 43, and is applied on the corresponding face of the piston 30 of the assistance cylinder. In practice, this pressure is modulated in dependence on the force exerted on the brake pedal, and if this latter is modified there is alternatively an opening and closure of the communication to the atmosphere controlled by the moving clapper 92.

However this may be, the force to which the piston 30 of the assistance cylinder 12 is then subjected due to the differential pressure which exists on its two faces, is additive to the force applied on the associated brake pedal.

The braking action is thus assisted.

FIG. 4 illustrates the application of the invention to the case in which a single brake pedal simultaneously operates two braking circuits with independent master cylinders. In this FIG. 4 certain elements have been omitted or cannot be seen; these are similar to the corresponding elements previously described.

Two twin master cylinders 110A, 110B are fixed on an assistance cylinder 112.

On the outlet side of one of these master cylinders, for example, the master cylinder 110B, is connected as previously a piloting valve 115 which controls the application to the chamber 136A of the assistance cylinder 112, either of a depression, or of pressure or of atmospheric pressure, as described above.

According to the invention, the rod 129 of the piston 130 of the assistance cylinder 112 is extended into the interior of the said assistance cylinder by a boss 120 which terminates in a hemispherical extremity 121 and which is in turn extended by a terminal stud 122.

On this stud 122 is engaged with play, a cup 123 which is provided for that purpose with a central opening 124, and which has round this opening a hemispherical surface 125 which is the complement of the rounded extremity 121 of the boss 120.

The master pistons 156A, 156B of the master cylinders 110A, 110B each bear against the bottom 127 of the cup 123 at points which are symmetrically arranged on each side of the axis of the cup.

It will be readily understood that this arrangement constitutes a knuckle-joint compensating bar ensuring the distribution to the master pistons 156A, 156B of the force applied by a rod 111 to the piston 130 of the assistance cylinder 112, in response to a depressive action applied to the brake pedal (not shown).

It will furthermore be observed that, as previously, the piston of an assistance cylinder is a part made of synthetic material overmoulded on an anchorage surface of the rod which carries it, and that in the example of FIG. 4, this anchorage surface is a knurled bearing surface 140.

As will be readily understood, the piloting valve is only controlled by a single braking circuit.

In the event of the other of these circuits becoming defective, when it would then be desirable to eliminate the assistance which remains applied to the first of these circuits, the invention provides, as suggested in broken lines 150, for the equipment of the piston 130 with a clapper valve arranged opposite the master piston 156B of the master cylinder 110B associated with the circuit which controls the piloting valve.

This clapper valve 150 is normally closed.

When the braking circuit controlled by the master cylinder 110A becomes defective, the compensating bar constituted by a cup 123 rocks in the direction of the arrow 151 of FIG. 4 and then controls the opening of the valve 150.

This latter is arranged in such manner as to put the chambers 136A, 136B of the assistance cylinder into communication when it is open.

The assistance ensured by the assistance cylinder is interrupted from that moment.

It has been assumed up to this point that the piston of the assistance cylinder acted directly on the master piston of the associated master cylinder. In an alternative form, the piston of the assistance cylinder can act on the control pedal and, through the intermediary of this latter, on the master piston.

The diagram of FIG. 5 illustrates this arrangement. There has been indicated at MC the master cylinder, at MP the master piston sliding in this latter, at CF the braking circuit controlled by the master cylinder, at PC the the control pedal, at PA the assistance cylinder, at P the piston of this latter, and at VP the piloting valve. As previously, this latter is in parallel to the braking circuit.

As will be readily understood, the piston P of the assistance cylinder can act on the brake pedal PF either directly as shown, or through the intermediary of a lever of any kind coupled to the said pedal, which enables the assistance cylinder to be housed under the dashboard for example, of the vehicle equipped with a device of this kind.

It will of course be understood that the present invention is not limited to the forms of embodiment described and illustrated, but includes any alternative form of construction.

In particular, if it is desired that the assistance provided by the assistance cylinder does not come into action immediately at the beginning of an action on the brake pedal, it is only necessary to give the spring 84 a calibration sufficient for the opening of the piloting valve to be correspondingly delayed.

What is claimed is:

1. A device for the assisted control of two braking circuits having independent master cylinders, especially for automobile vehicles, of the kind comprising an operating member such as the pedal, at least one master cylinder in which a master piston is adapted to slide under the action of said operating pedal, an assistance cylinder in which slides a piston with which said master piston is coupled for movement, at least unidirectionally, means for applying pressures on the two faces of said assistance piston, and a piloting valve which ensures, when at rest, equality of the pressures applied to the two faces of the piston of said assistance cylinder and which, responsive to the movement of said operating pedal, ensures, in response to this movement, an unbalance between said pressures so as to permit the piston of said assistance cylinder to act on said master piston, in which device each of said braking circuits is associated with an independent master cylinder arranged parallel to the master cylinder of the other braking circuit, the assistance cylinder is disposed between said brake pedal and said master cylinders, a distribution compensating bar is provided in said assistance cylinder and is interposed between the master pistons of the said master cylinders and the piston of said assistance cylinder, and said piloting valve is controlled by a pressure equal to the pressure existing in at least one of said braking circuits.

2. A device as claimed in claim 1, in which said compensating bar comprises a cup fixed by swivel joint means to the piston of said assistance cylinder, and on the bottom of which the master pistons of said master cylinders are supported.

3. A device as claimed in claim 1, in which the piston of said assistance cylinder comprises a clapper valve which is normally closed and which is disposed opposite the master piston of the master cylinder of that of said braking circuits which controls said piloting valve, the opening of said clapper valve being controlled by said compensating bar in the event of failure of the other braking circuit.

4. A device as claimed in claim 1, in which said piloting valve is disposed hydraulically downstream of said master cylinders.

5. A device as claimed in claim 1, in which, when at rest, the piston of said assistance cylinder receives equal pressures on its two faces, and the unbalance controlled by said piloting valve results from a modulated application of atmospheric pressure on one of said faces.

6. A device as claimed in claim 1, in which said piloting valve is actuated by a pressure equal to the pressure existing in one of said braking circuits.

7. A device as claimed in claim 1, in which said piloting valve comprises a first chamber communicating directly with said assistance cylinder and with the atmosphere under the control of a moving clapper valve urged by elastic means in the direction of a first clapper seating, a second chamber separated from said first chamber by a diaphragm disc and which communicates with a source of depression, a needle valve rigidly fixed to said diaphragm and acted upon by a piston responsive to the pressure existing in said braking circuit, said needle valve having an axial passage which communicates with said second chamber and which forms, with said moving clapper valve, a second clapper seating interposed between said first and second chambers, and elastic means adapted to hold said needle valve away from said clapper.

* * * * *